US006487071B1

(12) United States Patent
Tata et al.

(10) Patent No.: US 6,487,071 B1
(45) Date of Patent: Nov. 26, 2002

(54) METHODS AND APPARATUS FOR DAMPENING VIBRATION OF A DISK DRIVE

(75) Inventors: Scot Tata, Blackstone, MA (US);
Frank Rienzo, Mendon, MA (US);
Ronald Noret, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 244 days.

(21) Appl. No.: 09/628,967

(22) Filed: Jul. 31, 2000

(51) Int. Cl.[7] ............................................. G06F 1/16
(52) U.S. Cl. .................... 361/685; 360/99.04; 360/137; 248/638; 235/487
(58) Field of Search ...................... 361/685, 683–709; 360/99.04–99.05, 137; 235/487–492; 248/638

(56) References Cited

U.S. PATENT DOCUMENTS 5,546,250 A * 8/1996 Diel ........................ 360/97.02
6,134,113 A * 10/2000 Mills et al. .................. 361/725
6,302,714 B1 * 10/2001 Bolognia et al. ........... 439/157

* cited by examiner

*Primary Examiner*—Darren Schuberg
*Assistant Examiner*—Hung Van Duong
(74) *Attorney, Agent, or Firm*—Chapin & Huang, L.L.C.; David E. Huang, Esq.

(57) ABSTRACT

The invention is directed to techniques for dampening vibration of a disk drive using a dampening member which is co-planar with a mid-plane of the disk drive, and which has at least a portion extending from a carrier toward a main assembly when the carrier is installed within the main assembly in order to dampen vibration of the disk drive when the disk drive is in operation. The use of the dampening member in this location results in vibration dampening which is superior to conventional disk drive mechanisms. In particular, since the dampening member is co-planar with the mid-plane of the disk drive, the dampening member dampens vibration along a critical direction providing substantial vibration isolation. Accordingly, disk drives configured in accordance with the invention are capable of providing high performance even in high rotation speed (i.e., high RPM) and high density configurations.

20 Claims, 6 Drawing Sheets

METHODS AND APPARATUS FOR DAMPENING VIBRATION OF A DISK DRIVE

BACKGROUND OF THE INVENTION

A typical data storage system includes a cabinet that holds a configuration of disk drive mechanisms. Each disk drive mechanism generally includes a disk drive capable of storing and retrieving computerized data, and some form of housing or frame for supporting that disk drive within a support structure of the cabinet.

One conventional disk drive mechanism (hereinafter referred to as the "plastic housing disk drive mechanism") includes a plastic housing, a disk drive, and an interface card. The plastic housing surrounds and supports both the disk drive and the interface card. The plastic housing includes ventilation channels along its vertical sides to allow air to pass over portions of the disk drive in order to cool the disk drive. A support structure for the conventional plastic housing disk drive mechanism typically holds several of such disk drive mechanisms in a two dimensional array (i.e., multiple rows and columns).

Figure 1:
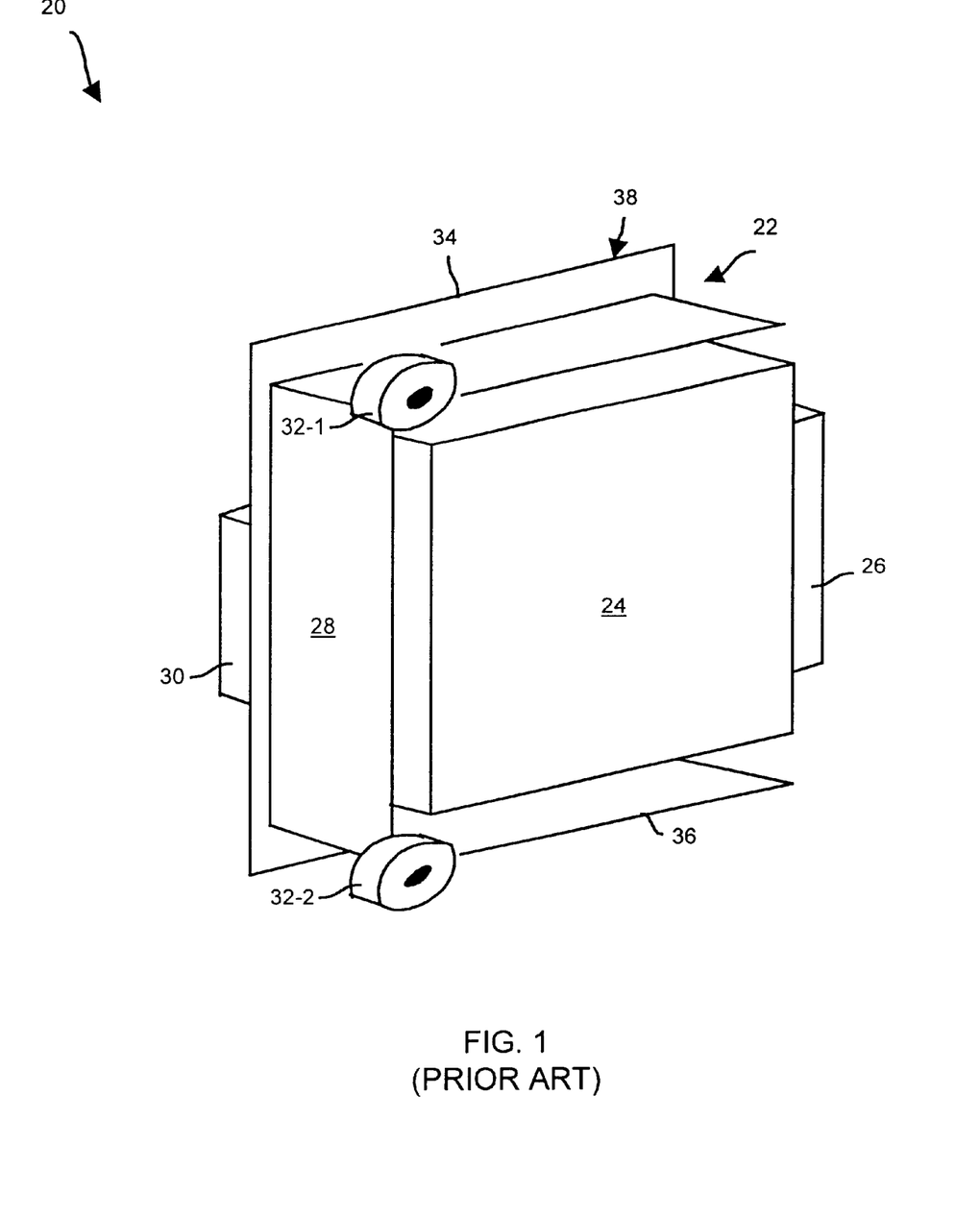
FIG. 1 is a perspective view of a conventional metal frame disk drive mechanism.

FIG. 1 shows another conventional disk drive mechanism 20 (hereinafter referred to as the "metal frame disk drive mechanism 20"). The metal frame disk drive mechanism 20 includes a chassis 22, disk drive 24, and a disk drive connector 26. The chassis 22 supports both the disk drive 24 and the disk drive connector 26. The chassis 22 includes a metal frame 28, a plastic actuator 30 and two compressible disk shaped members 32-1, 32-2 (collectively, disk shaped members 32). The metal frame 28 includes a main section 34, and a secondary section 36 which is riveted to the main section 34. Each section 34, 36 is made of thin galvanized metal, which is stamped and bent to generally conform to the shape of the disk drive 24. As such, when the disk drive 24 attaches to the chassis 22, the main section 34 extends along a side of the disk drive 24 in a parallel manner. The plastic actuator 30 fastens to a central area of the main section 34. The two disk shaped members 32 attach to corners of the secondary section 36 which are farthest from the main section 34, as shown in FIG. 1.

A support structure (not shown) for the conventional metal frame disk drive mechanism 20 holds a row of such mechanisms 20. Multiple support structures can be stacked on top of each other within a cabinet to form a two dimensional array of metal frame disk drive mechanisms 20 (i.e., multiple rows and columns).

When a user installs a conventional metal frame disk drive mechanism 20 into a support structure, the user slides edges 38 of the main section 34 into slots of the support structure, and then actuates the plastic actuator 30. In response, the disk drive connector 26 engages a corresponding connector of the support structure, and the disk shaped members 32 compress tightly against the support structure to firmly hold the metal frame disk drive mechanism 20 within the support structure.

SUMMARY OF THE INVENTION

Unfortunately, there are deficiencies with data storage systems using the above-described conventional disk drive mechanisms. In particular, these mechanisms are susceptible to vibration caused by mechanical component movement (e.g., disk drive head movement) during operation. It has been observed that such vibration can be up to 10 times greater along a vertical plane in which the magnetic platters and the disk drive head move, relative to other directions (e.g., horizontally, side-to-side, etc.). Random seek operations have been determined to provide particularly high vibration (e.g., rotational vibration in the plane of the platter and head movement). Such vibration can prevent the head from positioning itself properly relative to a magnetic platter of the disk drive. As a result, the platter must continue turning to enable the head to re-attempt to properly position itself (e.g., in order to read or write properly), thus lowering performance (e.g., access speeds).

Poor seek times due to disk drive vibration problems are, at least in part, a result of inadequacies in the supporting structure of the disk drive mechanism. For example, in connection with the conventional plastic housing disk drive mechanism, the plastic housing tends to stress and distort based on movement of the disk drive. Such movements (e.g., disk drive vibration due to head movement) are difficult to control using the plastic housing due to low modulus of elasticity in the plastic itself (e.g., uncontrolled energy absorption).

As another example, in connection with the metal frame disk drive mechanism 20, the metal section 34 in combination with the two disk shaped members 32 attempt to counteract the disk drive vibration. However, such vibration dampening is difficult to achieve due to the different approaches to supporting the disk drive mechanism 20 within the support structure used by the metal frame disk drive mechanism 20, i.e., a vertical metal section 34 on one side, and rubber disk shaped dampening members 32 on the other side.

Moreover, these conventional disk drive mechanisms have become more susceptible to vibration in recent years due to increases in disk drive rotation speeds (e.g., faster movement of internal mechanism components such as heads moving along magnetic platters spinning at faster rotations per minute or RPMs) and increases in disk drive densities (e.g., no longer using a dedicated platter for location tracking but instead using stripes/spokes to increase storage capacity). When used with conventional disk drive mounting mechanisms, such advances in disk drive technology have reduced the ability of disk drive heads to properly position themselves (i.e., read markings on the magnetic platters), and thus have made disk drives more susceptible to vibration problems.

In contrast to the above-described conventional disk drive mechanisms, the invention is directed to techniques for dampening vibration of a disk drive using a dampening member which is co-planar with a mid-plane of the disk drive, and which has at least a portion extending from a carrier toward a main assembly when the carrier is installed within the main assembly in order to dampen vibration of the disk drive when the disk drive is in operation. The use of the dampening member in this location results in vibration dampening which is superior to conventional disk drive mechanisms. Accordingly, disk drives configured in accordance with the invention provide high performance even in high rotation speed (i.e., high RPM) and high density configurations.

One arrangement of the invention is directed to a data storage system having a main assembly for holding multiple disk drive assemblies, and a disk drive assembly. The disk drive assembly includes a disk drive that stores and retrieves computerized data and a carrier coupled to the disk drive. The carrier supports the disk drive within the main assembly. The disk drive assembly further includes a dampening member coupled to the carrier at a location of the carrier which is co-planar with a mid-plane of the disk drive. At least a portion of the dampening member extends from the carrier toward the main assembly when the carrier is installed within the main assembly in order to dampen vibration of the disk drive when the disk drive is in operation. Since the dampening member is co-planar with the mid-plane of the disk drive, the dampening member dampens vibration along a critical direction providing substantial vibration isolation.

In one arrangement, the disk drive assembly further includes a lever that selectively (i) engages the disk drive assembly with the main assembly, and (ii) disengages the disk drive assembly from the main assembly. In this arrangement, the disk drive assembly further includes hardware which pivotably couples the lever to the carrier, and a dampening bushing which is positioned between the lever and the carrier by the hardware, in order to dampen vibration between the lever and the carrier. Here, the dampening bushing provides additional vibration isolation thus improving disk drive performance.

In one arrangement, the lever operates with the dampening member of the disk drive assembly to provide cantilevered support for the carrier of the disk drive assembly when the lever engages the disk drive assembly with the main assembly. Such support is superior to that of the conventional chassis disk drive mechanism which simply uses rubber disk shaped members in corners of one vertical side of a thin, galvanized metal frame. Accordingly, there is less vibration in the disk drive assembly of this arrangement.

In one arrangement, the main assembly includes connectors, and the disk drive assembly further includes a circuit board, coupled to the carrier, that mates with a connector of the main assembly. The circuit board provides friction between the carrier and the main assembly in order to dampen the vibration of the disk drive (e.g., in order to dampen vibration of a cantilevered end of the carrier) when the carrier is installed within the main assembly and when the disk drive is in operation. Accordingly, the circuit board improves the vibration isolation of the disk drive assembly.

In one arrangement, the main assembly includes support ribs, and the carrier of the disk drive assembly includes a set of guides that position a support rib of the main assembly along an area of an outer surface of the carrier. This area is co-planar with the mid-plane of the disk drive. The increase in contact area between the carrier and the main assembly, which is focused along the mid-plane of the disk drive, provides improved vibration dampening. Accordingly, the disk drive performance is improved and the design is less susceptible to increases in disk drive speed and density.

In one arrangement, the carrier of the disk drive assembly is formed by stamping, bending and welding a metal sheet into a single, contiguous metallic frame. This arrangement provides stiffness which is superior to that of the metal frame of the conventional metal frame disk drive mechanism, and that of the plastic housing of the plastic housing disk drive mechanism. Accordingly, this arrangement provides superior control over disk drive movement and energy absorption for improved vibration dampening.

The features of the invention, as described above, may be employed in data storage systems, devices and other computer-related components such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for dampening vibration of a disk drive using a dampening member which is co-planar with a mid-plane of the disk drive, and which has at least a portion extending from a carrier toward a main assembly when the carrier is installed within the main assembly in order to dampen vibration of the disk drive when the disk drive is in operation. The use of the dampening member in this location results in vibration dampening which is superior to conventional disk drive mechanisms. That is, the dampening member dampens vibration along a critical direction providing substantial vibration isolation since the dampening member is co-planar with the mid-plane of the disk drive. Accordingly, the disk drive is capable of providing high performance even if configured to operate in a high rotation speed (i.e., high RPM) and/or high density configuration. The features of the invention, as described above, may be employed in computer systems and related devices such as those manufactured by EMC Corporation of Hopkinton, Mass.

Figure 2:
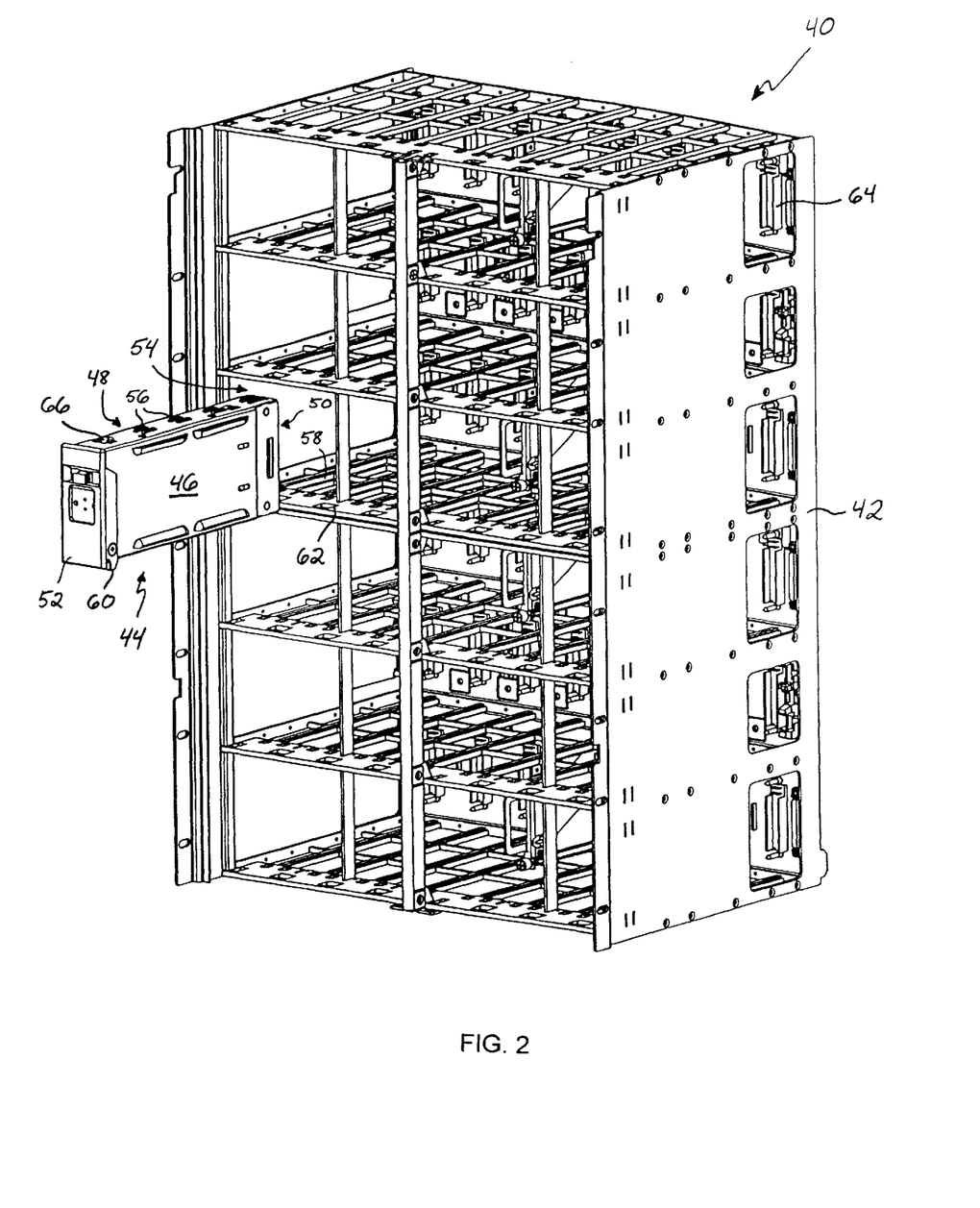
FIG. 2 is a perspective view of a data storage system having a main assembly and a disk drive assembly, which is suitable for use by the invention.

FIG. 2 shows a data storage system 40 which is suitable for use by the invention. The data storage system 40 includes a main assembly 42 and multiple disk drive assemblies 44, e.g., in an array of rows and columns, although only one disk drive assembly 44 is shown in FIG. 2 for simplicity. In one arrangement, the main assembly 44 resides within a cabinet adjacent to a fan assembly (e.g., below the fan assembly) in order to enable an air stream provided by the fan assembly to flow through and around the disk drive assemblies 44 for cooling purposes.

Each disk drive assembly 44 includes a carrier 46, a disk drive 48 (shown generally by the arrow 48 in FIG. 2), a circuit board 50 (shown generally by the arrow 50 in FIG. 2), and a lever 52. The disk drive assembly 44 installs within a slot 54 of the main assembly 42. In particular, when a user slides the disk drive assembly 44 into the slot 54, top and bottom guides 56 of the carrier 46 align with protruding top and bottom ribs 58 of the main assembly 42 to properly position the disk drive assembly 44 within the main assembly 42. The user then actuates the lever 52 (closes the lever 52) such that fingers 60 of the lever 52 grab the main assembly 42 at holes 62 in order to apply a proper amount of insert force on the disk drive assembly 44 to move the disk drive assembly 44 to its final position within the main assembly 42. In response, the circuit board 50 mates with a corresponding connector 64 of the main assembly 42, and top and bottom dampening members 66 of the disk drive assembly 44 compress between the carrier 46 and the main assembly 42. Further details of the disk drive assembly 44 will now be provided with reference to FIG. 3.

Figure 3:
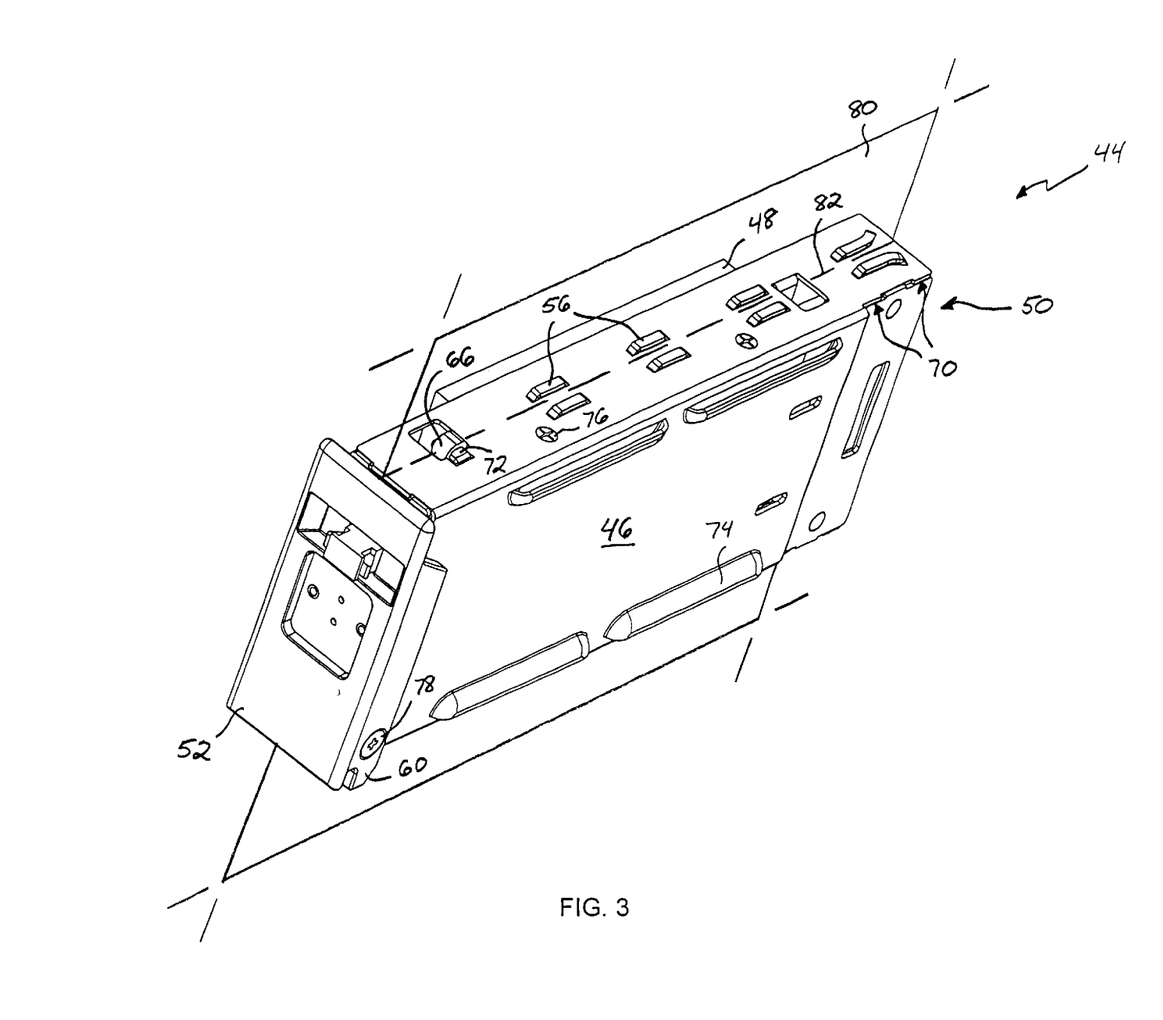
FIG. 3 is a perspective view of the disk drive assembly of FIG. 2 which includes a disk drive and dampening members which are co-planar with a mid-plane of the disk drive in order to dampen vibration of a disk drive.

FIG. 3 shows a perspective view of the disk drive assembly 44. The carrier 46 is preferably extremely stiff and rigid in order to operate in conjunction with ideally located dampening features to enable precise control of energy absorption and vibration isolation. In one arrangement, the carrier 46 of the disk drive assembly 44 is a solid metal structure formed by stamping and bending a section of raw steel. In this arrangement, the carrier 46 includes multiple welded points 70 (e.g., eight) for added support (see welded points 70 in FIG. 3). Preferably, the carrier 46 is thicker and more rigid than the metal frame sections 34, 36 of the conventional metal frame disk drive mechanism 20 (see FIG. 1). In one arrangement, the carrier 46 is formed from by stamping, bending and welding a metal sheet into a single, contiguous metallic frame, as a "unibody" configuration.

As shown in FIG. 3, a result of the stamping and bending process is a stiff metal frame with several formed features such as the top and bottom guides 56 which align the disk drive assembly 44 within the main assembly 42 (only the top guides 56 are shown in FIG. 3). Other formed features include tabs 72 for supporting the top and bottom dampening members 66 (only the top tab 72 and top dampening member 66 are shown in FIG. 3), and louvers 74 which allow an air stream to flow within the carrier 46 for cooling purposes. The disk drive assembly 44 further includes hardware 76 (e.g., screws, bolts, etc.) for coupling the disk drive 48 to the carrier 46, and hardware 78 for pivotably coupling the lever 52 to the carrier 46.

It should be understood that the top and bottom dampening members 66 include malleable material (e.g., rubber) and are positioned substantially within a plane 80 defined by a mid-plane of the disk drive 48. As shown in FIG. 3, the plane 80 intersects the carrier 46 along a line 82 between the top and bottom guides 56. As a result, when a user installs the disk drive assembly 44 within the main assembly 42, the disk drive assembly 44 is substantially supported by friction along the plane 80, namely, (i) contact between the outer surface areas of the carrier 44 along the line 82, and the protruding top and bottom ribs 58 of the main assembly 42 (also see FIG. 2) and (ii) contact between the top and bottom dampening members 66 and the main assembly 42. Preferably, at least a portion of each dampening member 66 compresses to an extent but not completely in order to provide improved energy absorption during operation. Further details of the disk drive assembly 44 will now be provided with reference to FIG. 4.

The objective of focusing vibration dampening along the mid-plane of the disk drive 48 results in part on the observation that disk drive vibration is up to 10 times greater in magnitude along the mid-plane, than in other directions (e.g., side-to-side). Accordingly, directing the effect of vibration dampening features such as the dampening members 66 to locations which are co-planar with the disk drive mid-plane provides vibration isolation where vibration magnitude is highest. These features of the invention provide vibration dampening which is superior to that obtained by the conventional disk drive mechanisms such as the plastic housing disk drive mechanism which has a plastic housing that responds to stresses and vibrations, and thus makes vibration more difficult to control.

Figure 4:
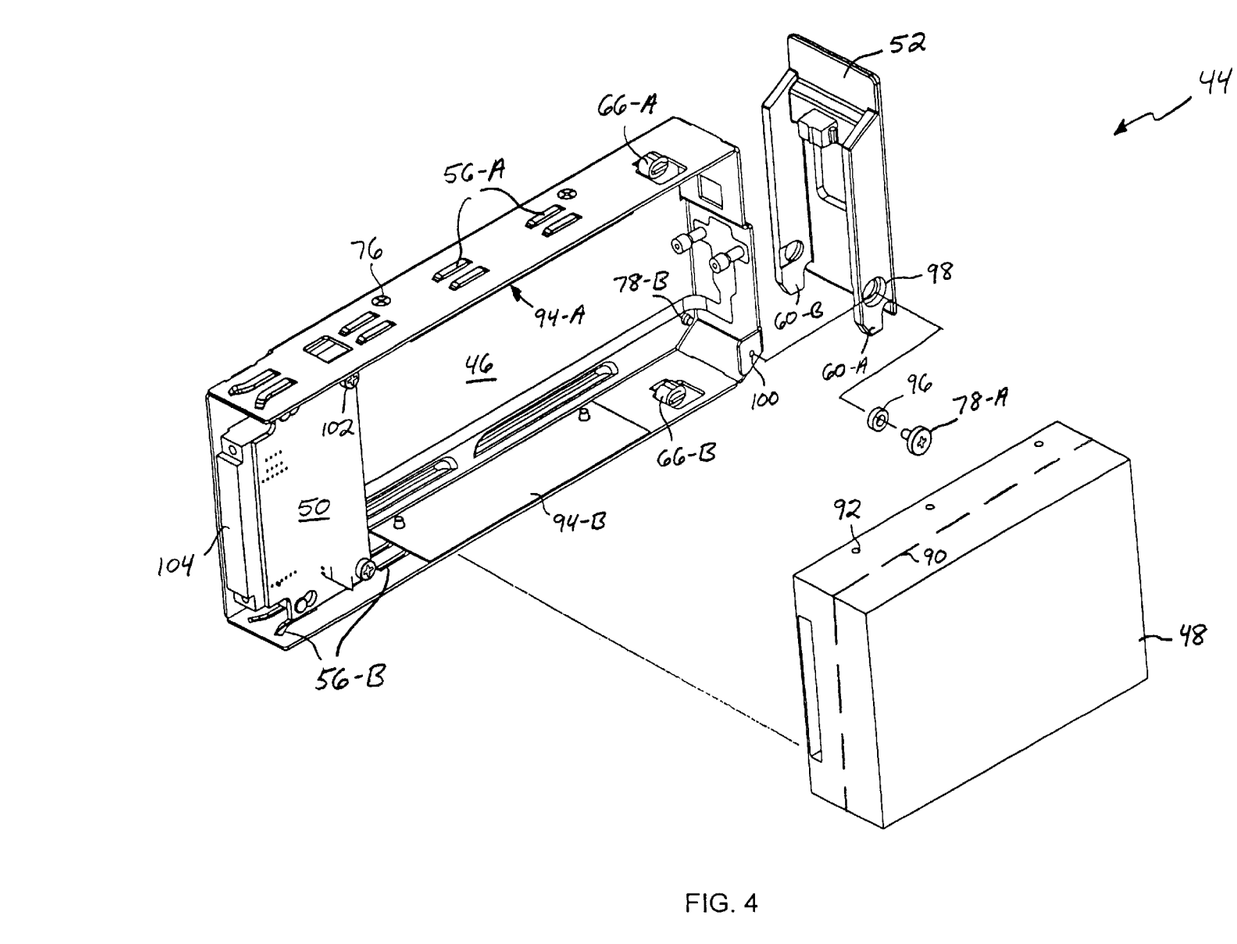
FIG. 4 is an exploded view of the disk drive assembly of FIG. 3 from a reverse angle.

FIG. 4 shows an exploded view of the disk drive assembly 44 from a reverse angle to that shown in FIG. 3. As shown, the disk drive 48 has a mid-plane 90 which defines the plane 80 (see FIG. 3) along which reside the top and bottom dampening members 66 (shown in FIG. 4 as 66-A and 66-B, respectively), and top and bottom guides 56 (shown in FIG. 4 as 56-A and 56-B, respectively). The disk drive 48 further includes holes 92 which align with the hardware 76 when the disk drive 48 is properly positioned within the carrier 46 to enable coupling of the disk drive 48 with the carrier 46.

As shown in FIG. 4, the disk drive assembly 44 further includes strips of dampening material 94-A, 94-B (collectively, dampening material 94) which line the inner top and bottom of the carrier 46 and which are perpendicular to the mid-plane 90 of the disk drive 48. As with the dampening members 66, the dampening material 94 is malleable (e.g., rubber, foam, etc.). In one arrangement, during manufacturing, the dampening material 94 is handled as a tape with an adhesive coating on one side in order to attach the dampening material 94 to the carrier 46.

In one arrangement, the height of the disk drive 48 is substantially equal to the distance between the dampening material 94-A and 94-B such that there is a "zero tolerance" or "line-to-line" fit between the disk drive 48 and the dampening material 94. When the hardware 76 attaches the disk drive 48 to the carrier 46, the dampening material can compress to an extent but not fully. As such, the dampening material 94 (and the hardware 76) prevents the disk drive 48 from contacting the carrier 46 directly and provides additional vibration dampening during disk drive operation.

Also, as shown in FIG. 4, the disk drive assembly 44 further includes dampening bushings 96 which reside between the hardware 78 (shown in FIG. 4 as right and left screws 78-A, 78-B) and the lever 52. As with the dampening members 66 and dampening material 94, the dampening bushings 96 are malleable (e.g., rubber). The dampening bushings 96 (one on each side of the lever 52) rest within holes 98 defined by the lever 52, and prevent the hardware 78 and the carrier 46 from contacting the lever 52 directly. Rather, the hardware 78 fastens within holes 100 of the carrier 46 such that the hardware 78 and the carrier 46 contact only the dampening bushings 96. Accordingly, the dampening bushings 96 provide additional vibration dampening during operation of the disk drive 48.

FIG. 4 further shows details of the circuit board 50. In particular, hardware 102 holds the circuit board 50 in place relative to the carrier 46. A connecting portion 104 of the circuit board 50 mates with a corresponding connector 64 of the main assembly (see FIG. 2). The circuit board 50 operates as an interface (e.g., a daughter card) between the disk drive 48 and external circuitry (e.g., a disk drive controller that connects with the disk drive assemblies 44 through the main assembly 42).

In one arrangement, the hardware 102 does not tightly hold the circuit board 50 to the carrier. Rather, the hardware 102 loosely holds the circuit board 50 to the carrier 46 thus enabling the circuit board 50 to move or float slightly in directions which are co-planar with the plane 80 of FIG. 3. In this arrangement, the ability of the circuit board 50 to float assists the circuit board 50 in aligning with the connector 64 of the main assembly. That is, the space for movement or "play" enables proper alignment between contacts (e.g., pins, pads, etc.) of the connecting portion 104 of the circuit board 50 and the connector 64 of the main assembly, and prevents damage (e.g., bent pins, etc.) that might otherwise occur during disk drive assembly installation.

Furthermore, when the circuit board 50 is held loosely by the hardware 102, the "play" provides vibration dampening between the disk drive assembly 44 and the main assembly 42. That is, once the circuit board 50 and the connector 64 have mated and are fully engaged, friction between the circuit board 50 and the carrier 46 dampens vibration caused by the disk drive 48 during operation (e.g., internally moving heads). Further details of the vibration dampening role of the circuit board 50 will now be provided with reference to FIG. 5.

Figure 5:
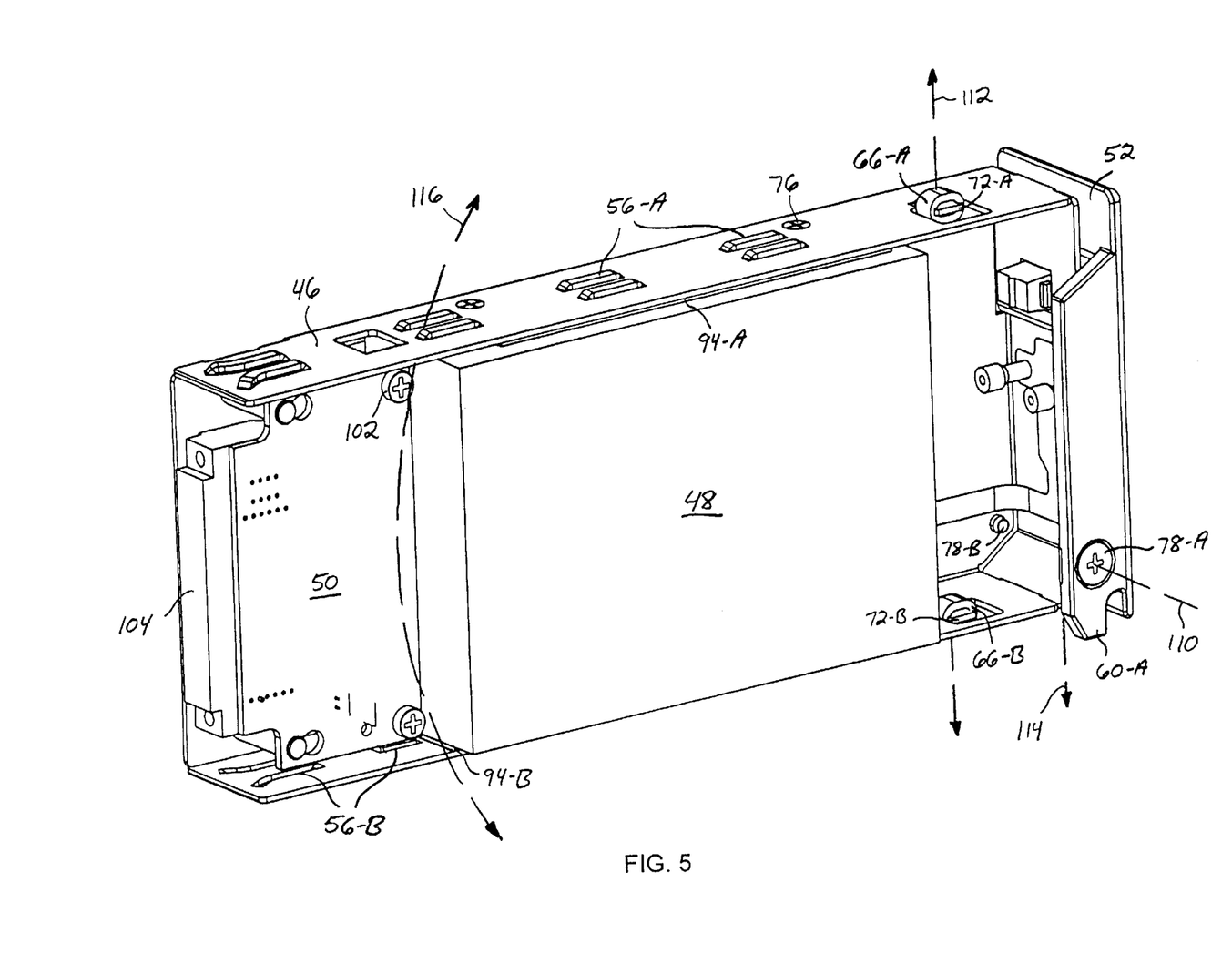
FIG. 5 is a perspective view of the disk drive assembly of FIG. 3 illustrating vertical support provided by (i) the dampening members and (ii) a lever of the disk drive assembly in order to form a cantilevered arrangement when the disk drive assembly is installed within the main assembly.

FIG. 5 shows a perspective view of the disk drive assembly 44 from a reverse angle to that of FIG. 3. When the disk drive assembly 44 is fully installed within the main assembly 42, portions of the dampening members 66 compress between the carrier 46 and the main assembly 42. As such, the dampening members 66 provide vertical support to the disk drive assembly 44 as illustrated by the arrows 112. Similarly, the fingers 60 (only one finger 60-A is shown in FIG. 5) of the lever 52 engage with holes 62 of the main assembly 42 (FIG. 2) thus enabling the lever 52 to provide some additional vertical support as illustrated by the arrow 114. The vertical support (arrows 112, 114), which is generally focused toward the front of the disk drive assembly 44 (i.e., the end of the disk drive assembly 44 having the lever 52), forms a cantilever structure which projects toward the end of the disk drive assembly 44 having the circuit board 50. To balance this cantilever effect (as illustrated by the arrows 116), the circuit board 50 connects with a connector 64 of the main assembly 42. The loose attachment of the circuit board 50 to the carrier 46 provides vibration dampening and counteracts the cantilever effect 116 thus preventing the disk drive assembly 44 from experiencing a severe vibration at that end of the disk drive assembly 44.

Figure 6:
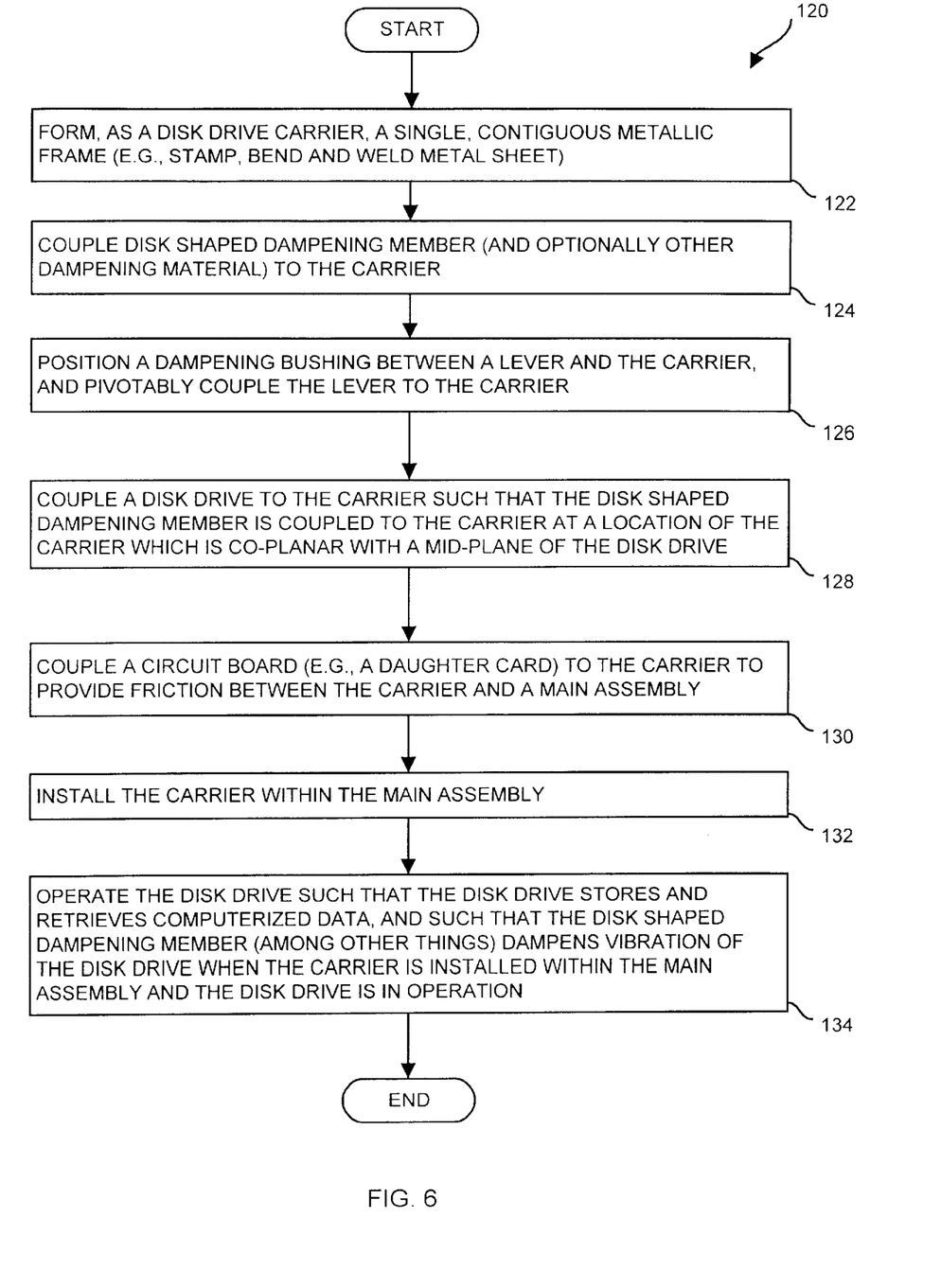
FIG. 6 is a procedure performed by a user for dampening vibration of a disk drive.

FIG. 6 shows a procedure 120 which is performed by a user to create, install and operate the disk drive assembly 44 in a vibration dampening arrangement according to the invention. In step 122, the user forms the disk drive carrier 46 as a single, contiguous metallic frame (e.g., stamped, bent and welded raw steel).

In steps 124–126, the user attaches dampening material to the carrier 46. In particular, in step 124, the user couples the disk shaped dampening members 66 to the tabs 72 of the carrier 46. The user can further couple the strips of dampening material 94 to the inner top and bottom sides of the carrier 46 in step 124. In step 126, the user positions the dampening bushings 96 between the lever 52 and the carrier 46 using the hardware 78.

In step 128, the user couples the disk drive 48 to the carrier 46 using the hardware 76 such that the disk shaped dampening members 66 align along the plane 80 defined by the mid-plane 90 of the disk drive 48. Accordingly, the dampening members 66 couple to the carrier at locations which are co-planar with the mid-plane 90 of the disk drive 48.

In step 130, the user couples the circuit board 50 to the carrier 46 using the hardware 102. Preferably, the circuit board 50 is held loosely by the hardware 102 such that friction between the carrier 46 and the main assembly 42 dampens vibration of the disk drive 48 when in operation.

In step 132, the user installs the carrier 46 (i.e., the disk drive assembly 44) within the main assembly 42. In particular, the user opens the lever 52, and slides the disk drive assembly 44 such that the guides 56 align with the protruding ribs 58 of the main assembly 42. After the disk drive assembly 44 has slid most of the way into the main assembly 42, the user actuates the lever 52. Fingers 60 of the lever 52 grab portions of the main assembly 42 to obtain leverage and provide insertion force that mates the connecting portion 104 of the circuit board 50 with the connector 64 of the main assembly 42. The user then fully closes the lever 52 to secure the disk drive assembly 44 within the main assembly 42.

In step 134, the user provides power to the disk drive assembly 44 and operates the disk drive assembly 44 (e.g., stores and retrieves data). At this point, vibration resulting from movement of mechanical components (e.g., the disk drive head or heads moving within the disk drive 48) is dampened by the dampening members 66, the dampening material 94, the dampening bushings 96 and the circuit board 50. These dampening features combined with the stiffness and rigidity of the carrier 46 enable precise control of energy absorption and vibration isolation.

As described above, the disk drive assembly 44 provides superior vibration isolation to that of the conventional plastic housing and metal frame disk drive mechanisms. In particular, the dampening members 66, which are co-planar with a mid-plane of the disk drive 48 and which extend from the carrier 46 toward the main assembly 42 when the carrier 46 is installed within the main assembly 42, provide substantial vibration dampening along the mid-plane of the disk drive 48. Accordingly, vibration dampening is focused along an area of the carrier (see line 82 of FIG. 3) where vibration can be up to 10 times the vibration in other directions (e.g., side-to-side vibration). Such vibration dampening increases performance of the disk drive 48 by reducing head locating errors. The features of the invention, as described above, may be employed in computer systems and related components (e.g., high performance disk drive assemblies) such as those provided by EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the dampening members 66 were shown as disk shaped members by way of example only. The dampening members 66 can have other shapes such as a rectangular shape, a ball shape, etc.

Additionally, the material of the dampening members 66, the dampening material 94, and the dampening bushings 96 was described as rubber by way of example only. Other materials are suitable for use by one or more of these components. Other suitable materials include foam padding, various plastic polymers, and other energy absorbing material.

Furthermore, it should be understood that the sizes and geometries of the carrier 46 can be made to mimic supporting structures of conventional disk drive mechanisms to make the disk drive assembly 44 backwards compatible in data storage systems using conventional disk drive mechanisms (e.g., compatible with conventional plastic housing disk drive mechanisms). Such features are intended to be within the scope of the invention.

What is claimed is:

1. A disk drive assembly, comprising:
   a disk drive that stores and retrieves computerized data;
   a carrier, coupled to the disk drive, that supports the disk drive within a main assembly; and a dampening member, coupled to the carrier at a location of the carrier which is co-planar with a mid-plane of the disk drive, at least a portion of the dampening member extending from the carrier toward the main assembly when the carrier is installed within the main assembly in order to dampen vibration of the disk drive when the disk drive is in operation.

2. The disk drive assembly of claim 1, further comprising:

a lever that selectively (i) engages the disk drive assembly with the main assembly, and (ii) disengages the disk drive assembly from the main assembly;

hardware which pivotably couples the lever to the carrier; and a dampening bushing, positioned between the lever and the carrier by the hardware, in order to dampen vibration between the lever and the carrier.

3. The disk drive assembly of claim 1, further comprising:

a lever that selectively (i) engages the disk drive assembly with the main assembly, and (ii) disengages the disk drive assembly from the main assembly, the lever operating with the dampening member to provide cantilevered support for the carrier when the lever engages the disk drive assembly with the main assembly.

4. The disk drive assembly of claim 1, further comprising:

a circuit board, coupled to the carrier, that mates with a connector of the main assembly, the circuit board providing friction between the carrier and the main assembly in order to dampen the vibration of the disk drive when the carrier is installed within the main assembly and when the disk drive is in operation.

5. The disk drive assembly of claim 1 wherein the carrier includes:

a set of guides that position a support rib of the main assembly along an area of an outer surface of the carrier, the area being co-planar with the mid-plane of the disk drive.

6. The disk drive assembly of claim 1 wherein the carrier is formed by stamping, bending and welding a metal sheet into a single, contiguous metallic frame.

7. A data storage system, comprising:

a main assembly for holding multiple disk drive assemblies; and a disk drive assembly having:
  a disk drive that stores and retrieves computerized data;
  a carrier, coupled to the disk drive, that supports the disk drive within the main assembly; and
  a dampening member, coupled to the carrier at a location of the carrier which is co-planar with a mid-plane of the disk drive, at least a portion of the dampening member extending from the carrier toward the main assembly when the carrier is installed within the main assembly in order to dampen vibration of the disk drive when the disk drive is in operation.

8. The data storage system of claim 7 wherein the disk drive assembly further includes:

a lever that selectively (i) engages the disk drive assembly with the main assembly, and (ii) disengages the disk drive assembly from the main assembly;

hardware which pivotably couples the lever to the carrier; and a dampening bushing, positioned between the lever and the carrier by the hardware, in order to dampen vibration between the lever and the carrier.

9. The data storage system of claim 7 wherein the disk drive assembly further includes:

a lever that selectively (i) engages the disk drive assembly with the main assembly, and (ii) disengages the disk drive assembly from the main assembly, the lever operating with the dampening member of the disk drive assembly to provide cantilevered support for the carrier of the disk drive assembly when the lever engages the disk drive assembly with the main assembly.

10. The data storage system of claim 7 wherein the main assembly includes connectors, and wherein the disk drive assembly further includes:

a circuit board, coupled to the carrier, that mates with a connector of the main assembly, the circuit board providing friction between the carrier and the main assembly in order to dampen the vibration of the disk drive when the carrier is installed within the main assembly and when the disk drive is in operation.

11. The data storage system of claim 7 wherein the main assembly includes support ribs, and wherein the carrier of the disk drive assembly includes:

a set of guides that position a support rib of the main assembly along an area of an outer surface of the carrier, the area being co-planar with the mid-plane of the disk drive.

12. The data storage system of claim 7 wherein the carrier of the disk drive assembly is formed by stamping, bending and welding a metal sheet into a single, contiguous metallic frame.

13. A method for dampening vibration of a disk drive, comprising the steps of:

coupling a dampening member to the carrier;

coupling the disk drive to the carrier such that the dampening member is coupled to the carrier at a location of the carrier which is co-planar with a mid-plane of the disk drive;

installing the carrier within a main assembly such that at least a portion of the dampening member extends from the carrier toward the main assembly; and operating the disk drive such that the disk drive stores and retrieves computerized data, and such that the dampening member dampens vibration of the disk drive when the carrier is installed within the main assembly and when the disk drive is in operation.

14. The method of claim 13, further comprising the step of:

prior to the step of installing, positioning a dampening bushing between a lever and the carrier, and pivotably coupling the lever to the carrier such that the dampening bushing dampens vibration between the lever and the carrier when the carrier is installed within the main assembly and when the disk drive is in operation.

15. The method of claim 13, further comprising the step of:

pivotably coupling a lever to the carrier such that the lever selectively (i) engages the disk drive assembly with the main assembly, and (ii) disengages the disk drive assembly from the main assembly, wherein the step of installing includes providing cantilevered support for the carrier from the lever and the dampening member when the lever engages the disk drive assembly with the main assembly.

16. The method of claim 13, further comprising the step of:

coupling a circuit board to the carrier such that the circuit board, when mated with a connector of the main assembly during the step of installing, provides friction between the carrier and the main assembly in order to dampen the vibration of the disk drive when the carrier is installed within the main assembly and when the disk drive is in operation.

17. The method of claim 13 wherein the step of installing includes the step of:

inserting the carrier into the main assembly such that a set of guides of the carrier position a support rib of the main assembly along an area of an outer surface of the carrier, the area being co-planar with the mid-plane of the disk drive.

18. The method of claim 13, further comprising the step of, prior to the steps of coupling:

stamping, bending and welding a metal sheet into a single, contiguous metallic frame in order to form the carrier.

19. A disk drive assembly, comprising:

a disk drive that stores and retrieves computerized data;

a carrier, coupled to the disk drive, that supports the disk drive within a main assembly; and dampening means, coupled to the carrier at a location of the carrier which is co-planar with a mid-plane of the disk drive, for dampening vibration of the disk drive when the carrier is installed within the main assembly and when the disk drive is in operation, at least a portion of the dampening means extending from the carrier toward the main assembly when the carrier is installed within the main assembly.

20. A disk drive carrier assembly, comprising:

a carrier that couples to a disk drive in order to support the disk drive within a main assembly; and a dampening member, coupled to the carrier at a location of the carrier which is co-planar with a mid-plane of the disk drive when the disk drive is coupled to the carrier, at least a portion of the dampening member extending from the carrier toward the main assembly when the carrier is installed within the main assembly in order to dampen vibration of the disk drive when the disk drive is in operation.

* * * * *